March 22, 1949.  W. H. STIGTER  2,464,900
HOT GAS APPARATUS COMPRISING A HEATER
SURROUNDING THE HOT CHAMBER
Filed Sept. 10, 1945

WILLEM HENDRIK STIGTER
INVENTOR

BY
ATTORNEY

Patented Mar. 22, 1949

2,464,900

UNITED STATES PATENT OFFICE 2,464,900

HOT GAS APPARATUS COMPRISING A HEATER SURROUNDING THE HOT CHAMBER

Willem Hendrik Stigter, Eindhoven, Netherlands, assignor to Hartford National Bank & Trust Co., Hartford, Conn., as trustee Application September 10, 1945, Serial No. 615,494
In The Netherlands July 1, 1944

Section 1, Public Law 690, August 8, 1946
Patent expires July 1, 1964

11 Claims. (Cl. 60—24)

This invention relates to improvements in heater construction for hot-gas apparatus such as a hot-gas engine.

The term "hot gas apparatus" is to be understood to mean a thermodynamic prime mover in which a thermodynamic circuit is traversed by a quantity of gas enclosed in a chamber of variable volume in which or in communication with which there is a heating part, and possibly a regenerator, and, in addition, a cooling part. The cooling part is in or in communication with a second chamber of variable volume. The chamber adjoining the heating part is referred to as the "hot chamber," and the chamber adjoining the cooling part as the "cold chamber."

Part of this quantity of gas enclosed in the said chambers may, if necessary, be admitted to one or more separate closed tubes or vessels and afterwards be returned out of one or more of these tubes or vessels to the said chambers. In all these cases the thermodynamic circuit is referred to as a closed circuit.

The cooling part of the engine may be omitted and replaced by a periodical communication with the open air, in which case for each cycle of operations a fresh quantity of air is sucked in. Such engines are referred to as "open circuit engines." Both with open circuit and closed circuit engines there is such a phase difference between the variations in volume of the hot and the cold chambers that the gas is subjected in succession to heating, expansion, cooling and compression.

The term "hot gas apparatus" is to be understood to include apparatus in which heat is stored in a gas which in succession is compressed, transmits this heat to a suitable cooling agent, such as water or air, is expanded and then again stores heat. This thermodynamic cycle of operations permits of raising a quantity of gas to a higher temperature. Such apparatus can act as a heat pump or as a refrigerating machine. This thermodynamic cycle also ensues in a gas enclosed in a chamber of variable volume in which or in communication with which there is a part intended for transmission of heat to the gas. This part in some cases comprises a regenerator, and in addition a part intended for the transmission of the heat of the gas to the said cooling agent, which part is moreover in communication with a second chamber of variable volume. The variations in volume of the two above-mentioned chambers ensue with such a phase difference that the thermodynamic circuit is traversed in the aforesaid sense. On the analogy of the similar thermodynamic prime mover the chamber adjoining the heat storing part will be referred to as the "hot chamber" and the other chamber as the "cold chamber," though with a heat pump or a refrigerating machine the hot chamber contains gas having a lower temperature than that of the cold chamber.

It has been suggested before now to provide hot gas apparatus with a sheath-like heater which surrounds the hot chamber of the motor and comprises a plurality of bores having housed in them parallel-connected channels for the heat supplying medium. The heat to be supplied to the gas that takes part in the thermodynamic cycle of operations is transmitted from the heat supplying medium across the wall of the bores and the material of the heater to the internal gas. In the well-known hot-gas engines the transmission of this heat to the gas in the motor cylinder must take place by means of ribs, in between which this gas is compelled to circulate. The whole quantity of heat to be supplied must thus pass through the inner wall of the sheath-like heater and this is not to the benefit of the speed of the heat transmission.

A primary object of this invention is to provide a heater for hot-gas apparatus devoid of the previous defects of such construction.

A further object of this invention is to provide an efficient hot-gas engine heater by avoiding the above mentioned problems.

Further objects, features and advantages of this invention will be apparent as the description proceeds hereinafter.

The transmission of heat from the heat-supplying medium to the gas circulating in the apparatus is materially improved, according to the invention, by the fact that the heater also comprises a plurality of bores having housed in them parallel-connected channels for the gas to be heated which takes part in the thermodynamic cycle of operations. The heat energy to be transmitted is thus divided into a great number of parallel-connected paths between the channels for the heat-supplying medium and the channels for the heat-storing gas. Each part of these paths need only travel a limited distance between a channel of the heat supplying medium and a channel of the gas across the material of the heater. The speed with which the heat exchange occurs is thus materially raised. Thus, in addition, the thermal resistance of the heater material affects the heat exchange to a less extent.

As the flow of gas in a hot-gas apparatus usually passes from the hot chamber through the member transmitting the heat to the gas to the further parts of the apparatus it is advisable from a structural point of view to so form the bores having the channels for the internal or secondary engine gas housed in them in this sheath-like heater that they comprise one opening on the inside of the sheath and one opening on the opposite outside. This permits of the flow of gas being conducted from the hot chamber through these bores in the heater to a chamber on the outside of the heater and thence to further parts in the apparatus.

In order that the invention may be clearly understood and readily carried into effect it will now be explained more fully with reference to the accompanying drawing, in which several embodiments are shown by way of example. These examples of forms of construction refer to a hot-gas engine, but similar constructions may be used for a heat pump or a refrigerating machine.

Figure 1:
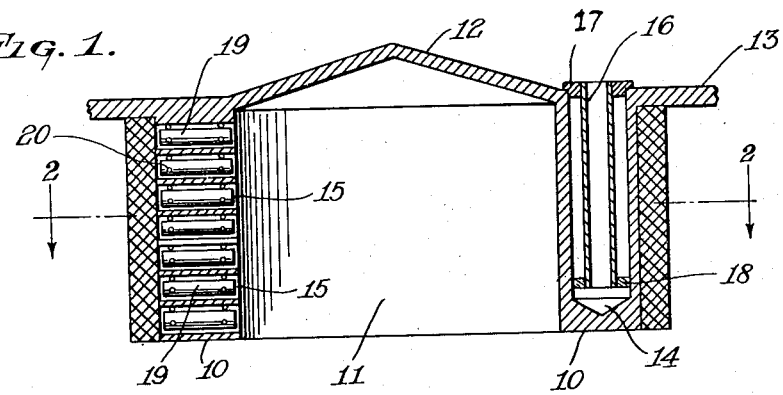
Fig. 1 is a vertical sectional view of one embodiment of the subject heater.

Referring to Figure 1, 10 designates a cylindrical heater which surrounds the hot chamber 11 of a hot gas engine in a sheath-like manner. The heat exchange between the heat supplying medium and the gaseous medium circulating in the motor ensues in the sheath-like heater 10. This sheath-like body 10 comprises a plurality of differently shaped and differently arranged bores 14 and 15 respectively. The bores 14 extend parallel to the axis of the cylindrical body from one of the end surfaces to nearly the opposite end surface. Thus, each of these bores forms in itself a channel having a dead end, which bores, however, by the insertion of a tube 16 of small diameter and composed of metal or ceramic material, is formed into channels respectively inlet and outflow of the gas. The channel for the inflowing gas is formed by the inner wall of the bore 14 jointly with the outer wall of the tube 16. The channel for the gas leaving the heater is internal of the tube 16 and is only formed by its inner wall. Communication between the channels for inlet and outflow results from the bore 14 being slightly longer than the tube 16. Several projecting lugs 17 and 18 ensure the correct position in the bore 14.

For the gaseous medium in the motor, provision is made for a plurality of bores 15 which are formed in the sheath-like body 10 in a radial direction. These bores open out into the inside and the outside of the jacket 10, so that they form, so to say, the communication between the hot chamber 11 and the further channels in the motor that are to be traversed by the gas. The regenerator 21 is arranged to surround the jacket 10 and thus extends the heater practically without clearance. As an alternative, however, instead of the regenerator a collecting channel for conducting the gas may be arranged to surround the jacket 10.

In order to ensure as intimate a contact as possible between the gas flowing through the bores 15 and the walls of these bores, cylindrical cores 19 of metal or ceramic material are provided inside these bores. Some projecting lugs 20 distributed about the periphery of these cores ensure the correct position of the cores 19 in the bores 15, so as to leave a narrow annular slit between the outside of the core and the inside of the bore, in which a core is arranged. Hence each channel for the medium to be heated is formed by the inner wall of a bore 15 and the external surface of a core 19.

Figure 2:
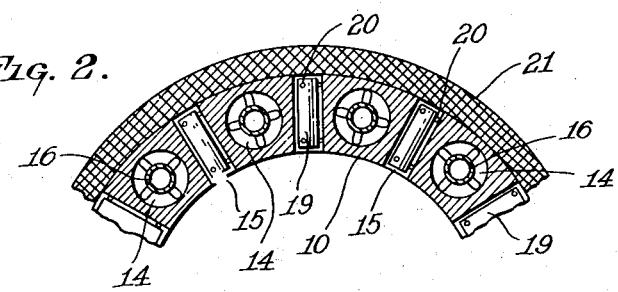
Fig. 2 is a fragmentary horizontal cross-sectional view of the Fig. 1 embodiment taken on the line 2—2.

As may be seen from Fig. 2, the axially extending bores 14 and the radially extending bores 15 are arranged alternately adjacent each other in the jacket 10, so that the heat to be transferred need only traverse the small distance between the walls of these bores across the material of the jacket 10. Indeed, in the present case it is possible for the distance between these two bores to be smaller than in the case of the bores being arranged parallel, there being less need to take into account the course of the holes during drilling. In addition, it is easier to introduce the combustion gases at the top end surface of the heater and again to conduct them away at the same surface, whilst the flow of gas in the motor from the hot chamber 11, passing radially through the heater 10 can reach the further parts of the motor, in this case the regenerator 21.

The sheath-like heater 10 is furthermore provided at one end surface with an outwardly bent cover 12 which serves to close the hot chamber 11. At the same end surface is provided a flange 13 which serves for the connection of the heater to the further parts of the motor. The lid 12 as well as the flange 13 may be made integral with the cylindrical heater or else afterwards be fastened to it by welding.

Figure 3:
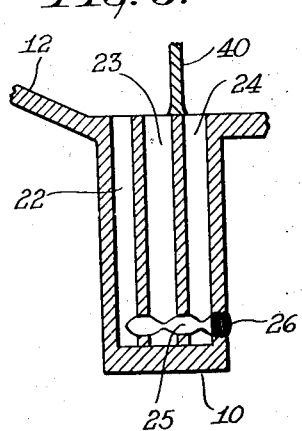
Fig. 3 is a second embodiment of the invention shown in a fragmentary vertical sectional view.

Fig. 3 shows a further form of construction of the channel for the heat supply medium. In this case it is assumed that the channels for the gas in the motor, formed in the bores 15, have the same construction as those shown in Figs. 1 and 2. In this case the channel for the primary heat supplying medium is constituted by three parallel bores 22, 23 and 24 provided in the jacket 10 from the same end surface thereof. These bores do not reach the other end surface of the jacket, but are connected near the end by a transverse bore 25 formed from the outside of this jacket. The aperture formed in the outer wall is sealed by means of a plug 26. In view of the three aforesaid bores, the two bores 22 and 23 form together in parallel connection the supply channel for the medium and the bore 24 alone the discharge channel. A larger section for the supply channel than the discharge channel is obviously necessary if the primary heat supplying medium is gaseous, and at the then prevailing higher temperature assumes a greater volume than the medium cooled after the heat transmission. At the top of the heater 10 the channels 22 and 23 on the one hand and the channel 24 on the other hand are separated by a wall 40 which, in the case of a cylindrical construction of the heater 10, may be made to form a ring of sheet metal.

Figure 4:
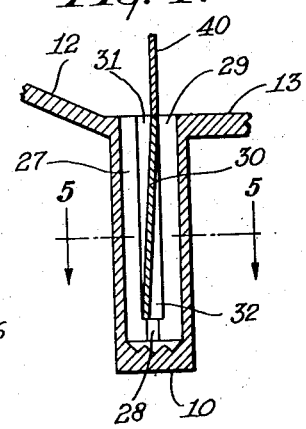
Fig. 4 is another embodiment of the invention shown in a fragmentary vertical sectional view.
Figure 5:
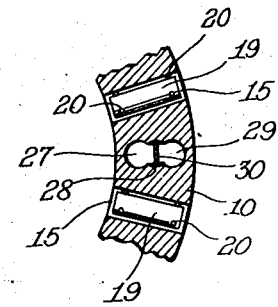
Fig. 5 is a fragmentary horizontal cross-sectional view of the Fig. 4 embodiment taken on the line 5—5.

Figs. 4 and 5 show a further form of construction of the channels for the heat supplying medium, it being assumed as before that the channels for the gas in the motor have the same shape as shown in Fig. 1. In this form of construction there are provided from one end surface of the cylindrical heater 10 three contiguous bores 27, 28 and 29 which however communicate with one another in the direction of length. In the central bore 28 a stud-like element is placed for a shorter distance than the depth of this bore. This stud-like element comprises throughout its length two grooves 31 and 32 tapered in opposite directions and opened out into the bores 27 and 29 respectively. Two channels are thus formed, to wit: an inflow channel through the bore 27 with the groove 31 and an outflow channel through the bore 29 jointly with the groove 32. The diameter of these two channels decreases through part of its length in the direction of the inflowing gas to the benefit of the heat transmission from the primary heat supply gas to the surrounding walls.

What I claim is:

1. In a hot-gas apparatus, a sheath-like heater body with transverse and longitudinal bores surrounding the hot chamber of this apparatus, comprising a plurality of symmetrical parallel-connected inlet and outflow channels housed in said longitudinal bores of this heater and intended for the medium supplying primary heat to the heater, a plurality of parallel-connected channels in said transverse bores for the medium to be heated which in the apparatus takes part in the thermo-dynamic cycle of operations.

2. Hot gas apparatus as claimed in claim 1, wherein the bores comprising the channels for the primary heat supplying medium extend substantially parallel to the longitudinal axis of the sheath-like heater body, whereas the bores in which the channels for the medium to be heated are housed in the wall of the heater body pass through this body substantially in a transverse direction.

3. Hot gas apparatus as claimed in claim 1, wherein the channels for the primary heat supplying medium have their inlet and outlet ports at one of the end surfaces of the sheath-like heater body, whereas the channels for the medium to be heated have one port on the inside and one port on the outside of this body.

4. A heater construction as described comprising a main cylindrical body with a substantially dome shaped end surface, said main body having a plurality of symmetrically spaced and substantially longitudinally disposed bores, means within said bores forming primary inlet and outlet channels, said means forming at said end surface inlet and outlet ports, said main body also having a plurality of symmetrically spaced and substantially transverse disposed bores, and medium confining means within said latter bores forming channels for the medium to be heated, said channels each having one port on the inside and one port on the outside of said body.

5. A heater construction as claimed in claim 4 wherein each of said medium confining means is disposed between said spaced longitudinal bores.

6. A heater construction as claimed in claim 4 wherein the channels for the primary heat supplying medium are formed by a plurality of bores in the heater body and by a transverse bore interconnecting said bores remote from said ports.

7. A heater construction as claimed in claim 4 wherein each said primary heat inlet and outlet channel forming means include two bores cut into said main body at one end surface and separated by a third bore which throughout its length constitutes a transverse communication between said two bores, said third bore having a stud-like element housed in it for part of its length.

8. A heater construction as described comprising an elongated jacket-like body with end surfaces, a plurality of symmetrically arranged and longitudinally disposed primary heat inlet and outlet channel means in said body, and a plurality of symmetrically arranged and transversely disposed secondary heater-medium channel means including spaced cores.

9. A heater construction as claimed in claim 8 wherein each said inlet and outlet primary heat channel means include the inner wall of a bore cooperating with a centrally spaced tube of small diameter.

10. A hot-gas engine heater comprising an elongated sheath-like body having a plurality of symmetrically spaced transverse bores and a plurality of groups of symmetrically spaced longitudinal bores, each kind of bores being also symmetrically spaced with respect to a neighboring different kind of bore, each of said groups of longitudinal bores comprising three bores contiguously aligned, a connection between said three bores being formed along their longitudinal axis, and path defining means within the middle one of said three bores of each said group of bores including a stud-like element of shorter length than the depth of said middle bore, said element having oppositely tapered longitudinal grooves opening into the first and third bores of said three aligned bores.

11. A hot-gas engine heater as claimed in claim 10 wherein said path defining means define a gas inflow channel and a gas outflow channel connected thereto and said grooves taper to form said inflow channel with a decreasing cross-section in the direction towards said outflow connection.

WILLEM HENDRIK STIGTER.

No references cited.